April 6, 1926.                                               1,579,824
                    A. H. LAURELL
ELECTRODE CONSISTING OF LENGTHS THAT CAN BE JOINED TOGETHER
                  IN A CONTINUOUS MANNER
                    Filed July 12, 1924

Inventor
A. H. Laurell
by
W. S. Evans
Attorney.

Patented Apr. 6, 1926.

1,579,824

UNITED STATES PATENT OFFICE.

AXEL HUGO LAURELL, OF DJURSHOLM, SWEDEN.

ELECTRODE CONSISTING OF LENGTHS THAT CAN BE JOINED TOGETHER IN A CONTINUOUS MANNER.

Application filed July 12, 1924. Serial No. 725,613.

*To all whom it may concern:*

Be it known that I, AXEL HUGO LAURELL, a subject of the King of Sweden, residing at Djursholm, Sweden, have invented certain new and useful Electrodes Consisting of Lengths That Can Be Joined Together in a Continuous Manner, of which the following is a specification.

The present invention relates to an electrode consisting of lengths that can be joined together in a continuous manner. The characteristic feature of the invention consists in forming the electrode of a tubular body of carbonized electrode material, which body is filled with crude electrode material and enclosed by the same material, the outer layer being surrounded by a sheet-metal sleeve.

The electrode according to the invention has the advantage over the known electrodes composed of connected lengths in that the crude electrode material is better held together in the sheet-metal sleeve. In addition to the greater compactness of the whole electrode, the tubular body has the advantage that the heat is better distributed for the rapid and effective carbonizing of the crude electrode material. I have previously produced an electrode consisting of a tubular body of carbonized electrode material filled with powdered crude electrode material, the electrode being gradually carbonized in the mass in an electrical furnace which is thus used in the same manner as in the factories for which the furnace is intended. Such a construction of electrode is not suitable for large electrodes, in contradistinction to the electrode according to the present invention.

An electrode constructed according to the invention is illustrated by way of example in the accompanying drawings in which—

Figure 1:
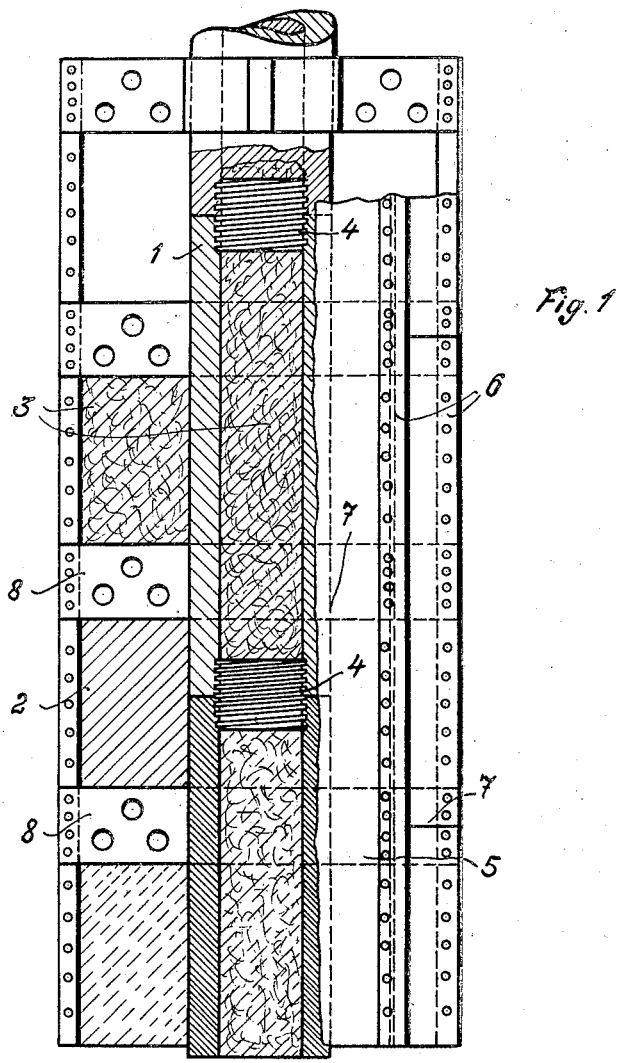
Figure 2:
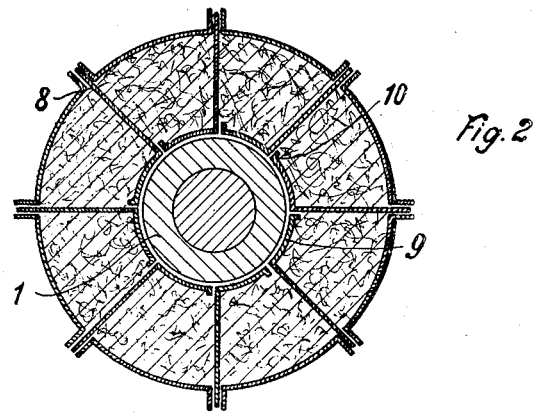

Fig. 1 is a vertical section, and
Fig. 2 is a horizontal section.

1 is the tubular body of carbonized electrode material, 2 is the sheet-metal sleeve, and 3 is the crude electrode material provided within and outside the body 1; 4 are screw-threaded parts for holding the adjacent sections of the tubular body together. It is obvious that other means for connection may be used. The sheet-metal sleeve 2 consists of a number of plates 5, which are provided with outwardly turned connecting flanges 6 and rivets or screws passing through the flanges, the plates 5 and consequently their transverse joints, being disposed in staggered relation to each other in the longitudinal direction. The tubular body 1 is connected to the sleeve 2 by radial perforated arms 8 in order to centre the body 1 and afford a passage from the outside to the body 1 for the electric current.

Fig. 2 shows clearly how these arms 8 are attached to the sheet-metal jacket 2 between its flanges by means of the rivets or screws before referred to, and to the body 1 by means of parts 9 bent round the body and provided with projecting flanges 10, which latter are fixed to the radial perforated arms to form a closed ring around the tubular body 1. The flange 6 serves to guide the electrode in the electrode holder and to make the necessary contact between the contact plates and the electrode. Owing to the staggered arrangement of the plates 5, the transverse joints of half of the plates 5 surrounding the periphery of the jacket at the same time extend below the electrode holder, therefore the danger of the part below this holder breaking away is considerably diminished, even if the joints are not welded together.

In making the electrode the lower part of the sheet-metal sleeve is first built up, the upper edges of the several plates being arranged in staggered relationship. An electrode body is placed within it and fixed and centered by means of a group of arms 8. Further, the crude electrode material is stamped down inside and outside the tubular body 1, the material outside the body 1 being stamped down only to the lower top edges of the plates 5. Thereupon a new series of plates are built up in the same way, another tubular body 1 is screwed on by means of a screw-threaded member 4 and another group of arms 8 is applied, whereupon the fresh material is stamped in, as hereinbefore described, outside the body 1, only to the lower top edges of this latter series of plates. The operations are then repeated in the same way.

The arrangement of the sheet-metal sleeve may be used with stamped-in crude electrode material in the case of other kinds of electrodes.

I claim:

1. An electrode formed in connected sections in line and comprising in combination a tubular body of sections connected in line and composed of carbonized electrode material, the said body being filled with crude electrode material, an outer layer of crude electrode material surrounding the said tubular body and a sheet metal sleeve surrounding the said outer layer of crude electrode material, substantially as described.

2. An electrode according to claim 1, in which the sheet metal sleeve is formed of a number of contiguous plates, the said plates being connected together by outwardly directed flanges disposed longitudinally, substantially as described.

3. An electrode according to claim 1, in which the sheet metal sleeve is formed of a number of contiguous plates connected together by outwardly directed flanges disposed longitudinally, the said plates being disposed in staggered relation with respect to each other longitudinally, substantially as described.

4. An electrode according to claim 1, in which the tubular body of carbonized electrode material is connected by radial arms with the sheet metal sleeve for centering the said tubular body and for conducting the electric current to it from an outside source.

AXEL HUGO LAURELL.